United States Patent [19]
Shibuya

[11] Patent Number: 4,604,530
[45] Date of Patent: Aug. 5, 1986

[54] POWER SUPPLY EQUIPMENT BACKUP SYSTEM FOR INTERRUPTION OF SERVICE

[75] Inventor: Tadao Shibuya, Numazu, Japan

[73] Assignee: Kabushiki Kaisha Meidensha, Tokyo, Japan

[21] Appl. No.: 641,000

[22] Filed: Aug. 15, 1984

[30] Foreign Application Priority Data

Aug. 16, 1983 [JP] Japan .................. 58-149482
Aug. 29, 1983 [JP] Japan .................. 58-157482

[51] Int. Cl.[4] .............................................. H02J 9/00
[52] U.S. Cl. ...................................................... 307/66
[58] Field of Search .................................. 307/44–46, 307/48, 52, 60, 64, 66, 87; 323/246

[56] References Cited

U.S. PATENT DOCUMENTS

| 4,241,261 | 12/1980 | Ebert, Jr. ............. | 307/45 |
| 4,277,692 | 7/1981 | Small ................... | 307/66 |
| 4,366,389 | 12/1982 | Hussey ................. | 307/66 |
| 4,471,233 | 9/1984 | Roberts ................ | 307/66 |
| 4,510,401 | 4/1985 | Legoult ................ | 307/66 |
| 4,516,035 | 5/1985 | Rhoads et al. ........ | 307/66 |
| 4,528,457 | 7/1985 | Keefe et al. .......... | 307/46 |

FOREIGN PATENT DOCUMENTS 796541 6/1958 United Kingdom .
1179616 1/1970 United Kingdom .
1176780 1/1970 United Kingdom .
1214880 12/1970 United Kingdom .

Primary Examiner—A. D. Pellinen
Assistant Examiner—Derek S. Jennings
Attorney, Agent, or Firm—Schwartz, Jeffery, Schwaab, Mack, Blumenthal & Evans

[57] ABSTRACT

A commercial AC source is connected to a load through the main line (1) via an AC switch (1a) only when the AC source is normal, and an inverter power source (10) is connected to the load through the auxiliary line (2) whether the AC source is normal or abnormal. In the case when the AC source changes from abnormal to normal, since the AC source is connected to the main line (1) after the inverter phase has matched the AC source phase, substantially no effective power is transmitted from the main line to the auxiliary line or vice versa, while a required power is being supplied from the AC source to the load (not from the inverter). Further, since an inverter inductor ($L_i$) and a main line inductor ($L_l$) are connected in the main and auxiliary lines, respectively, even if the AC source voltage fluctuates, it is possible to regulate the load voltage at a constant level by virtue of an inverter current flowing from the AC source to the inverter source or vice versa. Furthermore, it is also possible to charge an inverter battery by reducing inverter frequency a little lower than that of the AC source.

15 Claims, 11 Drawing Figures

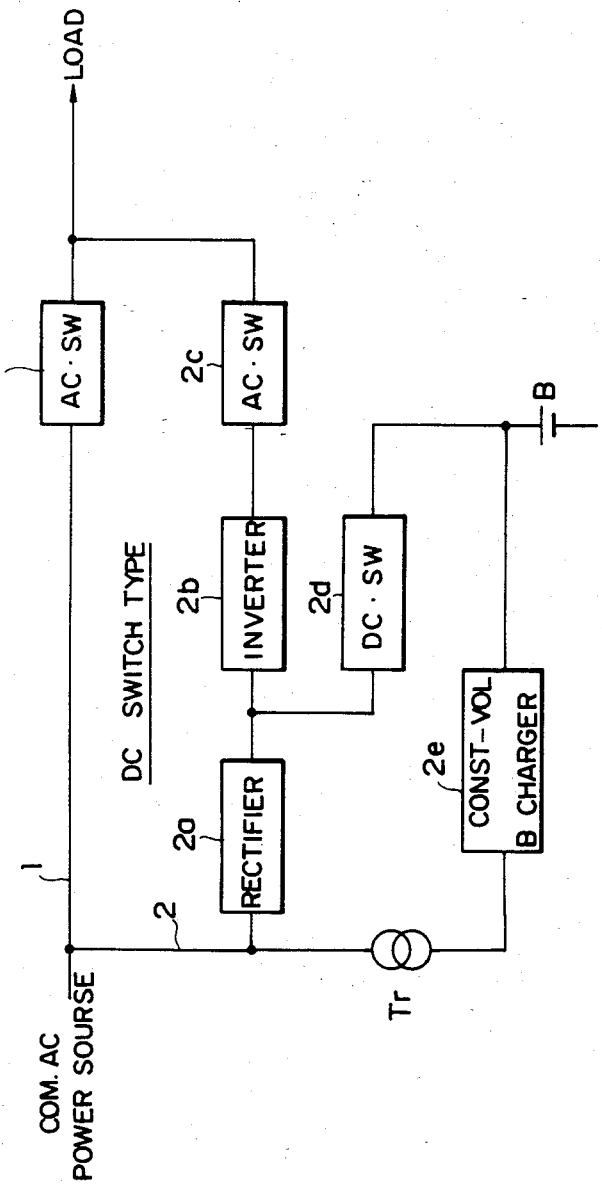

$V_ℓ < V_d$ $V < V_d$ $V_\ell < V_0$ $V_\ell < V_0$

POWER SUPPLY EQUIPMENT BACKUP SYSTEM FOR INTERRUPTION OF SERVICE

BACKGROUND OF THE INVENTION

1. Field of the Invention

The present invention relates generally to a power supply equipment backup system for interruption of service and more particularly to an inverter control system provided for a power supply equipment backup system for interruption of service, in which a power inverter is generally connected in parallel with a commercial AC power supply line in order to supply power from the inverter to a device load even when commercial AC power source fails.

2. Description of the Prior Art

Conventionally, power supply equipment backup system for interruption of service can roughly be classified into two types: DC switch type and floating type.

In the DC switch type, series-connected AC-DC converter (power rectifier) and a DC-AC converter (power inverter) are connected in parallel with a commercial AC power supply line; a battery is connected to the power inverter through a DC switch closed only when commercial AC power source is off; a constant-voltage battery charger is connected from the commercial AC power source to the battery to continuously charge the battery. Further, power is supplied continuously from only the power inverter through an AC switch even while the commercial AC power source is normal. In this type of power supply equipment backup system for interruption of service, however, there exist some shortcomings as follows:

(1) Since the power inverter is always in operation even while commercial AC power source is normal, the power efficiency is not sufficiently high, because the power rectifier loss is great.

(2) Since the power rectifier and the battery charger are incorporated within the equipment, the equipment is large in size and high in cost.

In the floating type, only a DC-AC converter (power inverter) is connected in parallel with a commercial AC power supply line; a battery is always connected to the power inverter; a constant-voltage battery charger is connected between the commercial AC power supply line and the battery to continuously charge the battery; a DC-DC converter and an automatic voltage regulator is provided for the battery. Similarly, power is supplied from only the power inverter through an AC switch even while the commercial AC power source is normal. In this type of power supply equipment backup system for interruption of service, however, there exist some drawbacks as follows:

(1) Since the power inverter is always in operation even while the commercial AC power source is normal and further the automatic voltage regulator always operates to keep the battery terminal voltage at a predetermined value as long as the commercial power source is normal, the power efficiency is not sufficiently high.

(2) Since the battery charger and the automatic voltage regulator are incorporated within the equipment, the equipment is large in size and high in cost.

A more detailed description of the prior-art power supply equipment backup system for interruption of service will be made hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a power supply equipment backup system for interruption of service which is small in size, low in cost and high in power switching reliability.

It is another object of the present invention to provide a power supply equipment backup system for interruption of service which can improve the total power efficiency markedly.

It is still another object of the present invention to provide a power supply equipment backup system for interruption of service which can automatically regulate the device load voltage at a constant level even if the commercial AC power source fluctuates.

It is an additional object of the present invention to provide a power supply equipment backup system for interruption of service which can charge the power inverter battery while the commercial AC power source is normal.

To achieve the above-mentioned first object, the power supply equipment backup system for interruption of service according to the present invention comprises (a) an AC switch connected to the commercial AC power source; (b) a commercial AC power source monitoring means for outputting a power-on signal A to said AC switch for activating said switch when the commercial AC power source changes from abnormal to normal; (c) power inverter means for supplying an inverter power source to the device load whether the commercial AC power source is normal or abnormal; (d) basic inverter frequency presetting means for outputting a triangular wave signal to determine an inverter frequency on the basis of a preset inverter frequency value (fo); (e) basic inverter voltage presetting means for outputting a DC voltage signal to determine an inverter output voltage on the basis of a preset inverter voltage value ($V_o$); and (f) inverter controlling means for comparing the triangular wave signal with the DC voltage signal in voltage level and for outputting inverter control signals to said inverter means, inverter frequency being determined by the triangular wave signal frequency, and further effective inverter voltage being determined by time intervals during which the triangular wave signal exceeds the DC voltage signal in voltage level.

In the equipment thus constructed, the commercial AC power source is supplied to the device load through the main power supply line via said AC switch only when the commercial source is normal and inverter power source is always supplied to the device load through the auxiliary power supply line irrespective of whether the commercial AC power source is normal or abnormal, without providing neither a battery charger nor a power rectifier.

To achieve the above-mentioned second and third objects, the power supply equipment backup system for interruption of service according to the present invention further comprises (a) a main supply line inductor ($L_l$) connected between said AC switch ($1a$) and the device load and (b) phase matching means including phase difference detecting means connected between the commercial AC power source and said basic inverter frequency presetting means with a feedback loop connected from said inverter controlling means thereto, said phase matching means detecting phase difference between the commercial AC power source and the inverter power source, outputting a phase difference signal to said inverter frequency presetting means to adjust inverter source frequency (fi) to commercial AC power source frequency (fc), and outputting a phase match signal B to said commercial AC power source monitoring means for allowing said monitoring means to output a power supply signal C to said AC switch to supply the commercial AC power source to the device load only when inverter power source has matched commercial AC power source in phase.

In the equipment thus constructed, the commercial AC power source is supplied to the device load in phase with the inverter power source, so that substantially no effective power is transmitted between the main power supply line and the auxiliary power supply line, a required power is supplied from only the commercial AC power source to the load (no power is supplied from the inverter), and additionally the device load voltage ($V_d$) is substantially regulated at a constant voltage level automatically, when commercial AC power source voltage fluctuates, by passing an inverter current from the commercial AC power source to the inverter power source or vice versa in dependence upon the voltage difference between the main power supply line and the auxiliary power supply line to develop a voltage drop or a voltage rise across an inverter inductor and across the main supply line inductor.

To achieve the above-mentioned fourth object, the power supply equipment backup system for interruption of service according to the present invention further comprises a battery charging power presetting means for reducing inverter frequency (fi) a little to supply a battery charging power from the main power supply line to the auxiliary power supply line by passing a current from the commercial AC power source to the battery through said inverter means in dependence upon a small phase difference between the commercial AC power source and the inverter power source caused by a small frequency difference between the two.

BRIEF DESCRIPTION OF THE DRAWINGS

The features and advantages of the power supply equipment backup system for interruption of service according to the present invention over the prior art equipment will be more clearly appreciated from the following description taken in conjunction with the accompanying drawings in which like reference numerals designate corresponding elements or sections and in which:

FIG. 1(A) is a schematic block diagram of a prior-art power supply equipment backup system for interruption of service of the DC switch type;

DETAILED DESCRIPTION OF THE PREFERRED EMBODIMENTS

Figure 1B:
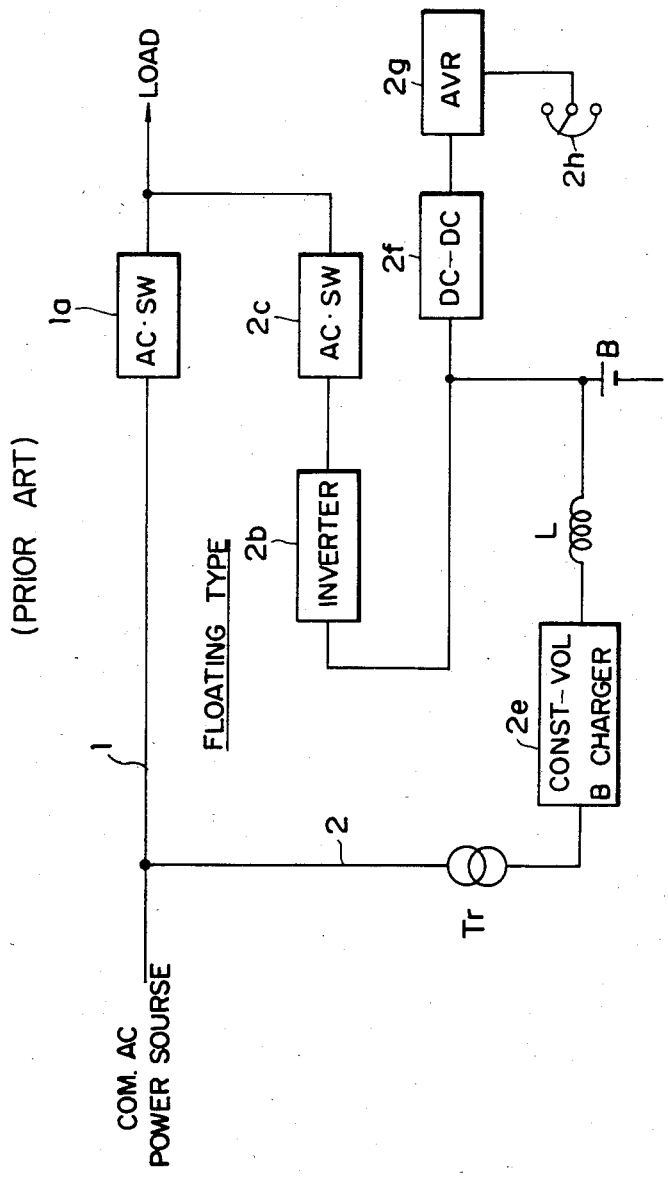
FIG. 1(B) is a schematic block diagram of a prior-art power supply equipment backup system for interruption of service of the floating type.

To facilitate understanding of the present invention, a brief reference will be made to some prior-art power supply equipment backup systems for interruption of service with reference to the attached drawings.

FIG. 1(A) shows an example of prior-art power supply equipment backup system for interruption of service of DC switch type. In the drawing, a commercial AC power source is connected to a load through a main power supply line 1. An AC switch 1a is connected between the commercial AC power source and the load. In parallel with the main power supply line 1, an auxiliary power supply line 2 is connected to supply inverter power source to the load. In the auxiliary power supply line 2, an AC-DC converter (power rectifier) 2a, a DC-AC converter (power inverter) 2b and an AC switch 2c are connected in series. Additionally, a transformer Tr and a constant-voltage battery charger 2e are connected in series to an inverter battery B connected to the inverter 2b through a DC switch 2d to continuously charge-up the inverter battery B as long as the commercial AC power source is normal. In the above description, the reason why the switches 1a, 1c, and 2d are classified into AC switches and DC switches is that in general these switches are not mechanical switches but semiconductor switches made up of thyristors and diodes and therefore the circuit configuration thereof is different from each other. In any semiconductor switches, a large current can be passed or cut off in response to small gate signals applied to the thyristors.

The prior-art equipment shown in FIG. 1(A) operates as follows: when the commercial AC power source is on or normal, the AC switch 1a is kept off, the AC switch 2c is kept on and the DC switch 2d is kept off. Therefore, only the power inverter 2b is connected to the load to supply the commercial AC power source to the load through the auxiliary power supply line 2 via the inverter 2b. In the auxiliary line 2, the commercial AC power source is first converted into DC power source through the rectifier 2a and then converted again into AC by the inverter 2b having an appropriate frequency roughly equal to that of the commercial AC power source. When the commercial AC power source is normal, since the inverter battery B is disconnected from the rectifier 2a by the DC switch 2d, the inverter 2b operates in dependence upon power supplied from the commercial AC power source. Additionally, the battery B is kept charged up by the commercial AC power source through the constant-voltage battery charger 2e and the transformer Tr. On the other hand, when the commercial AC power source fails, the DC switch 2d is turned on to connect the battery B to the inverter 2b. Therefore, the inverter 2b is kept operated by virtue of the battery B which has been charged up by the commercial AC power source while the commercial AC power source is normal. Further, in case where the inverter 2b is out of order and therefore should be repaired, the AC switch 1a is turned on to directly supply the commerical AC power source to the load and the AC switch 2c is turned off. Further, since the power capacity of the battery B is not infinite but limited, if the commercial AC power source fails for many hours, it is necessary to operate an electric generator (not shown) and connect it to the power inverter 2b.

In the prior-art power supply equipment backup system for interruption of service of this DC switch type as described above, the power efficiency is not high because the power rectifier 2a is always operating while dissipating much electric power, irrespective of whether the commercial AC power source is normal or not. Additionally, the equipment is large in size and high in cost because the power rectifier 2a and the constant-voltage battery charger 2e are incorporated therein.

FIG. 1(B) shows an example of prior-art power supply equipment backup system for interruption of service of the floating type. In the drawing, similarly to FIG. 1(A), a commercial AC power source is connected to a load through a main power supply line 1. An AC switch 1a is connected between the commercial AC power source and the load. In parallel with the main power supply line 1, an auxiliary power supply line 2 is connected to supply inverter power source to the load. In the auxiliary power supply line 2, a transformer Tr, a constant-voltage battery charger 2e, an inductor L, a DC-AC converter (power inverter) 2b and an AC switch 2c are connected in series. Additionally, a DC-DC converter 2f and an automatic voltage regulator 2g provided with a voltage presetting device (variable resistor) 2h are connected to a battery B connected to the inverter 2b to continuously regulate the battery voltage to a predetermined value even when the commercial AC power source voltage fluctuates.

The prior-art equipment shown in FIG. 1(B) operates as follows: when the commercial AC power source is on or normal, the AC switch 1a is kept off, the AC switch 2c is kept on. Therefore, only the power inverter 2b is connected to the load to supply the commercial AC power source to the load through the auxiliary power supply line 2 via the inverter 2b. In the auxiliary supply line 2, the commercial AC power source is first charged into the battery B and converted again into inverter AC power source having an appropriate frequency roughly equal to that of the commercial power source.

The battery B is continuously charged by the commercial AC power source supplied through the constant-voltage battery charger 2e and the inductor L after the commercial AC power source voltage has been matched through the transformer Tr to a voltage level appropriate to the inverter power supply. Further, in order to maintain the battery voltage at a predetermined level, the automatic voltage regulator 2g is connected to the battery terminal through a DC-DC converter 2f, the predetermined voltage level being adjustable by presetting the battery voltage presetting device 2h. Therefore, when the commercial AC power source fails, the power inverter 2b is kept operated by virtue of the battery B which has been charged up by the AC commercial power source when the power source is normal. Further, in case where the inverter 2b is out of order and therefore should be repaired, the AC switch 1a is turned on to directly supply the commercial AC power source to the load and the AC switch 2c is turned off.

In the prior-art power supply equipment backup system for interruption of service of this floating type as described above, the power efficiency is not sufficiently high because the power inverter 2b is always operating and further the automatic voltage regulator 2g is always in operation to keep the battery terminal voltage at a predetermined value as long as the commercial AC power supply is normal. Additionally, the equipment is large in size and high in cost because the battery charger and the automatic voltage regulator are incorporated therein.

In view of the above description, reference is now made to an embodiment of the power supply equipment backup system for interruption of service according to the present invention with reference to the attached drawings.

Figure 2:
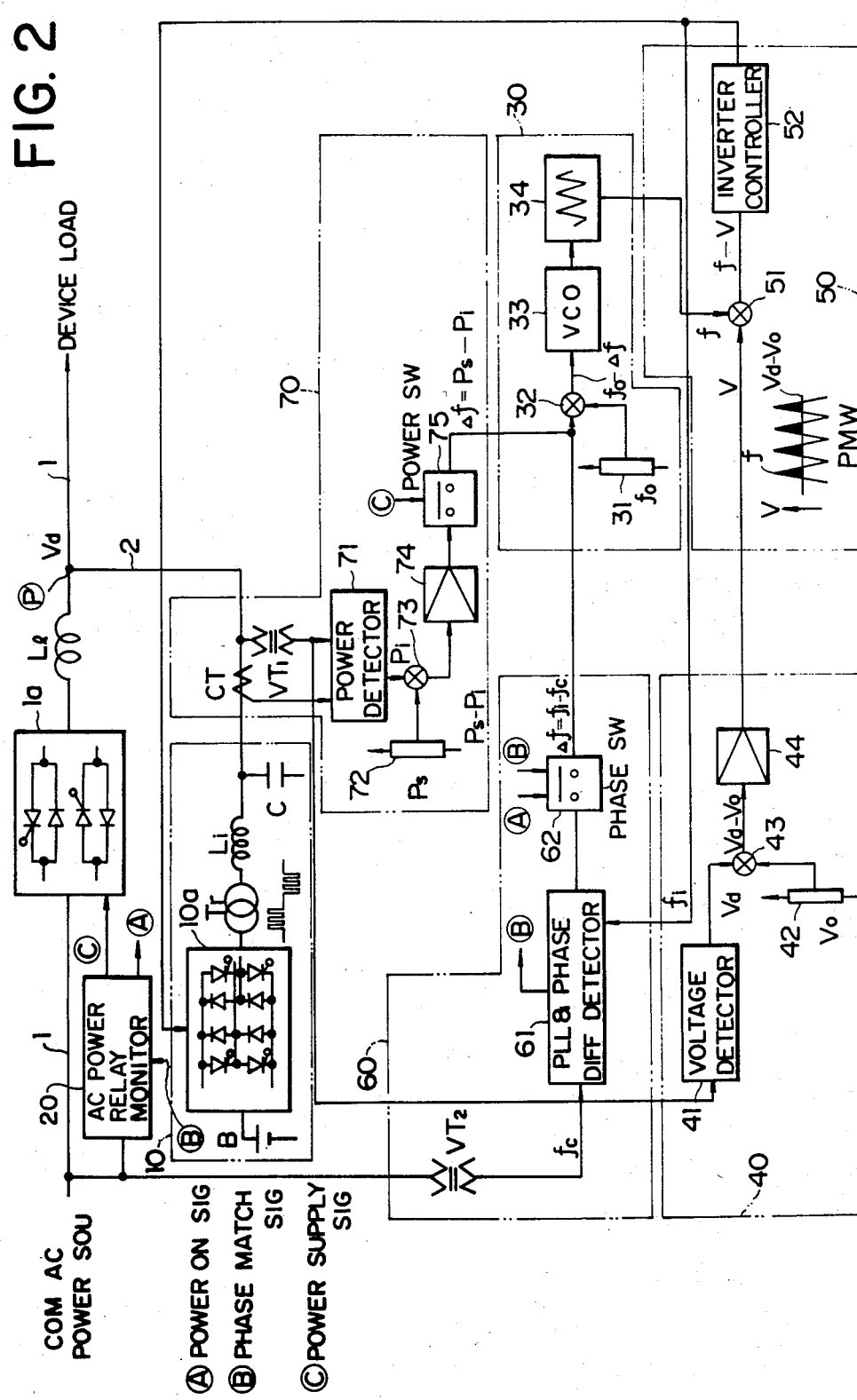
FIG. 2 is a schematic block diagram of the power supply equipment backup system for interruption of service according to the present invention, which is mainly made up of a power inverter and an inverter control system.

The equipment shown in FIG. 2 is roughly made up of a main power supply line 1 including an AC switch 1a and a main power supply line inductor $L_l$ and an auxiliary power supply line 2 including a power inverter 10 which is controlled by an inverter control system. The inverter control system comprises a commercial AC power source monitor 20, a basic inverter frequency presetting section 30, a basic inverter voltage presetting section 40, an inverter controlling section 50, and further a phase matching section 60 and a battery charging power presetting section 70.

In the case of a single-phase equipment, the AC switch 1a connected between the commercial AC power source and a device load is made up two semiconductor switching elements (e.g. thyristors) connected reversely in parallel with each other as shown in FIG. 2. One of two thyristors is turned on alternately by the commercial AC power source voltage because the thyristor is forward-biased and a gate current is passed. Further, the two diodes are incorporated to prevent an excessively-high voltage from being applied to each thyristor. Therefore, when the AC switch 1a is activated, the commercial AC power source is supplied to the device load through the AC switch 1a as in an usual mechanical switch.

The main power supply line inductor having inductance $L_l$ carries out an important function in regulating the device load voltage automatically at a constant level, which will be described herein later in greater detail with reference to various vector diagrams shown in FIGS. 3 to 6.

The power inverter 10 is made up of an inverter battery B, a main inverter circuit 10a for converting DC power source into AC power source, a transformer Tr for impedance matching between the inverter 10 and the device load, and a filter including an inductance $L_i$ and a capacitance C for wave-form converting a pulse inverter source signal to a sine-wave inverter source signal similar to the commercial AC power source. The inverter 10 is connected in parallel with the main power supply line 1 with the inverter output terminal connected to the device load. The inverter circuit 10a is made up of a plurality of thyristors and a plurality of diodes. In the case of a single phase inverter, a pair of series-connected thyristors are connected in parallel with other pairs of series-connected thyristors, as depicted in FIG. 2. Further, a plurality of diodes are connected reversely in parallel with each of the thyristors to allow a reverse current to pass from the inverter output terminal to the battery B in the reverse direction. In the inverter circuit 10a, an inverter output signal having any desired pulse width can be obtained by appropriately applying gate signals to each thyristor in sequence. In other words, it is possible to obtain any desired power source signals having different output voltages and different output frequencies, that is, different output power by controlling inverter frequency and effective inverter voltage. In more detail, the inverter output power increases with increasing inverter gate frequency; the effective inverter voltage increases with increasing inverter gate pulse width or with decreasing inverter gate pulse interval. Further, in general, PWM(Pulse Width Modulation) control method is adopted in order to simultaneously control both the frequency and the voltage of the inverter power source signal, in which a triangular wave signal is compared with a DC voltage level to determine each timing of the gate signals. Further, it should be noted that the pulse inverter power source signal should be converted into a sine-wave power source signal through the filter ($L_i$ and C), because the commercial AC power source is usually a sine-wave signal.

The commercial AC power source monitor 20 is a kind of relay to detect whether the commercial AC power source is normal (the voltage lies within a predetermined range) or abnormal (the voltage lies out of the predetermined range). When the commercial power source is normal, the monitor relay is energized to output a power-on signal A; when the commercial source is abnormal, the minotor relay is deenergized to output no signal. Further, the commercial power source monitor 20 outputs a power-supply signal C to the AC switch 1a, in order to supply the commercial AC power source to the device load, in response to a phase match signal B (described later).

The basic inverter frequency presetting section 30 is made up of a basic inverter frequency presetting device 31 (variable resistor), an inverter frequency adder 32, a voltage-controlled oscillator 33 and a triangular-wave signal generator 34.

The basic inverter frequency presetting device 31 serves to preset a desired basic inverter frequency fo outputted from the inverter 10 in the form of a DC voltage level, the basic frequency being roughly the same as that of the commercial AC power source. Hereupon, it should be noted that the inverter power will be increased with increasing inverter frequency, because when the frequency increases, the number of inverter output signals increases for a fixed time period on the assumption that the inverter output voltage is constant.

The inverter frequency adder 32 adds a frequency adjusting signal Δf (phase difference signal or power difference signal both described later) and the basic inverter frequency fo in voltage level and outputs a frequency difference signal (fo−Δf) in DC voltage level. The frequency adder 32 is of an operational amplifier type.

The voltage controlled oscillator (VCO) 33 is a kind of oscillator for outputting an oscillation signal the frequency of which is proportional to the voltage level inputted thereto. Therefore, the output signal frequency of the VCO 33 increases with the increasing voltage level indicative of frequency difference (fo−Δf).

The triangular-wave signal generator 34 outputs a triangular-wave signal the frequency of which is equal to the frequency of the output signal of the VCO 34.

The basic inverter voltage presetting section 40 is made up of an inverter output voltage detector 41, a basic inverter voltage presetting device 42 (variable resistor), an inverter voltage comparator 43, and an inverter voltage difference signal amplifier 44.

The inverter output voltage detector 41 is connected to a voltage transformer $VT_1$ to detect the output terminal voltage $V_d$ of the inverter 10.

The basic inverter voltage presetting device 42 serves to preset a desired inverter output voltage $V_o$ outputted from the inverter 10 in the form of a DC voltage level, which is roughly the same as commercial AC power source voltage. Hereupon, it should be noted that the sine-wave inverter output voltage $V_o$ can be determined by adjusting the pulse width of the inverter output source signal in accordance with a pulse width modulation method. That is to say, the wider the pulse width of the inverter output pulse signal, the higher the sine-wave inverter output signal voltage, or the narrower the pulse interval of the inverter output pulse signal, the lower the sine-wave inverter output signal voltage on the assumption that the inverter frequency is constant.

The inverter voltage comparator 43 compares a voltage level detected by the inverter output voltage detector 41 with the basic inverter voltage $V_o$ and outputs a voltage difference signal ($V_o - V_d$) in DC voltage level. The voltage comparator 43 is of an operational amplifier type.

The inverter voltage difference signal amplifier 44 amplifies the voltage difference signal ($V_o - V_d$) inputted thereto.

The inverter control section 50 comprises an inverter voltage-frequency comparator 51 and an inverter controller 52.

The voltage-frequency comparator 51 compares in voltage level the triangular wave signal (f) outputted from the triangular wave signal generator 34 with the voltage difference signal ($V_d - V_o$) outputted from the amplifier 44 and outputs inverter timing signals at each point of intersections between the triangular wave signal and the voltage difference signal.

In more detail, as depicted by the wave form shown in FIG. 2, each time point at which each rising voltage level leg of the triangular wave signal matches the flat voltage level of the voltage difference signal determines each time point at which thyristors are turned on; each time point at which each falling voltage level leg of the triangular wave signal matches the flat voltage level of the voltage difference signal determines each time point at which thyristors are turned off. Therefore, the higher the voltage difference signal voltage level, the narrower the thyristor gate signal width and therefore the lower the inverter output voltage; the lower voltage difference signal voltage level, the wider the thyristor gate signal width and therefore the higher the effective inverter output voltage.

The inverter gate controller 52 outputs each gate on-or-off signal to each inverter thyristor in order in response to the timing signals outputted from the voltage frequency comparator 51 and in accordance with pulse width modulation method.

The inverter phase matching section 60 comprises a voltage transformer $VT_2$, a phase different detector 61 including a phase locking loop circuit connected to the inverter controller 52, and a phase switch 62.

The voltage transformer $VT_2$ is directly connected to the commercial AC power source. The phase difference detector 61 is connected to the voltage transformer $VT_2$ and the inverter controller 52. The phase difference between the commercial AC power source and the inverter power source is detected and the detected phase difference signal is applied to the inverter frequency adder 32 to match both the phases. Therefore, the line connecting between the phase difference detector 61 and the inverter controller 52 is a feedback loop. The phase difference detector 61 outputs a positive phase difference signal when inverter frequency fi is higher than commercial AC source frequency fc and a negative difference pulse signal when fi is lower than fc and smoothes the phase difference signal into a DC voltage signal applicable to the frequency adder 32.

The phase difference between commercial AC power source and the inverter power source can be matched with each other in accordance with the following method: a positive phase difference signal is allowed to rise when the inverter signal exceeds a fixed voltage level and to fall when the commercial power source signal exceeds the same fixed voltage level in the case where the inverter frequency fi is higher than the commercial AC power source frequency fc. Therefore, the pulse width of the above positive phase difference signal is to be indicative of phase difference between the two signal (when fi>fc). After having been smoothed into a positive DC voltage level, this positive phase difference signal ($\Delta f = fi - fc$) is applied to the frequency adder 32 to decrease the inverter frequency fi.

In contrast with this, a negative phase difference pulse signal is allowed to fall when the commercial power source signal exceeds the same fixed voltage level and to rise when the inverter signal exceeds the same fixed voltage level in the case where the inverter frequency fi is lower than the commercial AC power source frequency fc. Therefore, the pulse width of the above negative phase difference signal is to be indicative of phase difference between the two signal (when fi<fc). After having been smoothed into a negative DC voltage level, this negative phase difference signal ($\Delta f = fi - fc$) is applied to the frequency comparator 32 to increase the inverter frequency fi.

Additionally, the smoothed positive or negative DC voltage level is compared with a predetermined reference voltage level and a phase match command signal B is outputted from the phase difference detector 61 when the smoothed voltage level drops below the reference level.

The phase switch 62 is closed in response to the power-on signal A outputted from the commercial AC power source monitor 20 but opened in response to this phase-match signal B outputted from the phase difference detector 61. Further, this phase match signal B is also applied to the commercial AC power source monitor 20. In response to this phase match signal B, the commercial source monitor 20 outputs a power-supply signal C to the AC switch 1a and a power switch 75 (described later) disposed in the battery charging power presetting section 70. In summary, the phase switch 62 is closed when the commercial AC source changes from power failure to power restoration, but opened when the inverter source phase matches the commercial AC source phase. Further, after the inverter source phase has matches the commercial AC source phase, the commercial AC power source is connected to the device load.

The battery charging power presetting section 70 comprises a current transformer CT and a voltage transformer $VT_1$ both arranged at the output terminal of the inverter 10, an inverter power detector 71, a battery charging power presetting device 72, a battery charging power adder 73, an amplifier 74 and a power switch 75. The function of this presetting section 70 is to reduce the inverter frequency to reversely supply commercial AC power to the battery B through the inverter 10.

The inverter power detector 71 is connected to the current transformer CT and the voltage transformer $VT_1$ to detect the effective power of inverter output signal and to output a voltage signal indicative of effective inverter power. The inverter power presetting device (variable resistor) 72 serves to preset any desired battery charging power supplied from the commercial AC power source to the battery B through the inverter 10 in the form of DC voltage level. The power adder 73 adds a voltage level $P_i$ indicative of an actual battery charging power and a voltage level $P_s$ indicative of a preset battery charging power and outputs a power difference signal $\Delta f = P_s - P_i$ in DC voltage level. The power adder 73 is of an operational amplifier type.

The power difference signal amplifier 74 amplifies the power difference signal $\Delta f = P_s - P_i$. The power switch 75 is closed in response to the power supply signal C outputted from the commercial AC power source monitor 20 in response to the phase-match signal B from the phase difference detector 61.

The power difference signal $\Delta f$ is further added to the basic inverter frequency signal fo by the inverter frequency adder 32 to control the inverter frequency. In the case where there exists a small frequency difference between the commercial AC power source and the inverter power source, a small phase difference between the two is inevitably produced. Therefore, if the commercial AC power source leads the inverter power source by a small phase angle, it is possible to reversely supply power from the main power supply line 1 to the auxiliary power supply line 2 in order to charge the inverter battery B.

The operation of the power supply equipment backup system for interruption of service according to the present invention shown in FIG. 2 will be described hereinbelow. The essential function or operations will first be summarized below as follows:

(1) When commercial AC power source fails, the power inverter 10 operates to apply battery power to the device load.

(2) When commercial AC power source changes from power failure to power restoration, the inverter phase is so adjusted as to match the commercial AC source phase by controlling inverter frequency. When the two phases match, the commercial AC power source is supplied to the device load in addition to the inverter source.

(3) When commercial AC power source is normal, since the voltage phase of the inverter source matches that of the commercial power source, no effective power is transmitted from the commercial AC source to the inverter source or vice versa. In other words, power loss in the inverter is kept at its minimum while standing by in the event of failure of the commercial AC power source.

(4) When the commercial source is normal, the power inverter so operates as to automatically keep the device load voltage at a constant level even if the commercial AC source voltage fluctuates.

(5) When the commercial source is normal, the power inverter can also be so operated as to charge the inverter battery by lowering the inverter frequency a little below the commercial power source frequency, while regulating the device load voltage at a constant level.

The above essential operations will be described hereinbelow in greater detail in order.

(1) When commercial AC power source fails:

Since the commercial AC power source monitor 20 outputs no command signals A and C, the power switch 75 and the phase switch 62 are both kept opened. Accordingly, the AC switch 1a is also deactivated. Therefore, the power inverter 10 operates in accordance with the gate control signals outputted from the inverter controller 52. The inverter frequency is a basic value fo and the inverter voltage is also a basic value $V_o$, both the values being near those of the commercial AC power source. In more detail, since a voltage level (corresponding to fo) determined by only the basic frequency presetting device 31 is applied to the voltage controlled oscillator (VCO) 33, the VCO 33 oscillates at a frequency fo and the triangular wave generator 34 outputs a triangular wave signal of a frequency fo. On the other hand, a voltage level (coresponding to $V_o$) determined by only the basic voltage presetting device 42 is applied to the frequency-voltage (f-v) comparator 51. The f-v comparator 51 compares the triangular wave signal (fo) voltage level with the basic voltage signal voltage level ($V_o$) and outputs inverter timing signals at each point of intersections between the triangular wave signal and the basic voltage signal. Appropriate inverter thyristors are turned on when each rising leg of the triangular wave signal matches the basic voltage signal and turned off when each falling leg of the triangular wave signal matches the basic voltage signal. That is to say, in response to these inverter timing signals, the inverter controller 52 outputs each gate on-or-off signal to each thyristor. The above-mentioned method is called a PWM (pulse width modulation) method. Hereupon, it should be noted that both the basic inverter frequency fo and the basic inverter voltage $V_o$ should be determined to be roughly equal to those of the commercial AC power source. Further, although the basic inverter frequency fo is fixedly determined by the basic frequency presetting device 31, the basic inverter voltage $V_o$ is automatically adjusted by the inverter voltage presetting section 40 and the inverter controller 50. In more detail, when the device load voltage $V_d$ increases, since the voltage difference ($V_d - V_o$) also increases, the pulse width of the triangular wave signal exceeding the difference voltage ($V_d - V_o$) decreases to narrow the pulse width of the inverter output signal (pulse), so that the effective inverter output voltage (sine wave) is reduced. In contrast with this, when the device load voltage $V_d$ decreases, since the voltage difference ($V_d - V_o$) also decreases, the pulse width of the triangular wave signal exceeding the voltage ($V_d - V_o$) increases to widen the pulse width of the inverter output signal (pulse), so that the inverter output voltage is increased.

(2) When the commercial AC power source restores is restored within a normal voltage range:

Since the commercial AC power monitor 20 outputs a power-on command signal A to the phase switch 62, the switch 62 is closed. On the other hand, since the commercial AC power source signal is applied to the phase difference detector 61 through the voltage transformer VT$_2$ and further the inverter gate control signal is directly applied from the inverter controller 52 to the phase difference detector 61, the phase difference between the two signals is detected. In more detail, if the inverter frequency fi is higher than the commercial source frequency fc (fi>fc) and therefore the inverter phase leads the commercial source phase, a positive phase difference signal ($\Delta f = fi - fc$) is generated and applied to the frequency adder 32 via the phase switch 62 to reduce the inverter frequency fi. In contrast with this, if the inverter frequency fi is lower than the commercial source frequency fc (fi>fc) and therefore the inverter phase lags the commercial source phase, a negative phase difference signal ($\Delta f = fi - fc$) is generated and applied to the frequency adder 32 to increase the inverter frequency fi. In summary, two signal phases are detected and the inverter frequency is adjusted by the aid of the phase matching section 60 and the basic inverter frequency presetting section 30 so that two signal phases match.

Further, in this embodiment, a positive or negative phase difference signal $\Delta f$ is compared with a reference voltage level in the phase difference detector 61. When the phase difference signal ($\Delta f$) is below the reference value, the phase difference detector 61 outputs a phase match command signal B to the commercial AC power monitor 20 and the phase switch 62. Therefore, in response to this command signal B, the commercial AC power monitor 20 outputs another power-supply signal C to the AC switch 1a to activate it, so that the commercial AC power source is supplied to the device load through the main power supply line 1 after two-phase matching. In addition, in response to this command signal B, the phase switch 62 is opened to disconnect the phase matching section 60 from the inverter frequency presetting section 30.

(3) Under these conditions, the commercial AC power source and the inverter output are both supplied to the device load simultaneously. Here, it should be noted that the inverter frequency fo is roughly equal to the commercial AC source frequency fc, the inverter voltage $V_o$ is also roughly equal to the commercial AC source voltage, and additonally the inverter output is substantially in phase with the commercial AC source. Therefore, the inverter output voltage $V_o$ balances with the commercial AC source voltage at point P (device load voltage) in FIG. 2. In other words, no effective inverter power is transmitted to the main source supply line 1, so that the power loss in the inverter is kept at its minimum. However, if the commercial AC source fails, the inverter 10 can immediately supply a power to the device load through the auxiliary power supply line 2 in phase with the commercial AC source. The above inverter condition may be called a stand-by state.

Further, under the condition where the commercial power source is normal, since the inverter output power detected by the inverter power detector 71 is small, the voltage level $P_s$ of the inverter power presetting device 72 is set to approximately zero. If not, the power comparator 73 outputs a power difference signal $\Delta f = P_s - P_i$; as a result the basic inverter frequency fo is reduced by that amount $\Delta f$, deviating from the commercial AC source frequency.

(4) Further under these conditions where the commercial AC power source is normally supplied, it is possible to automatically regulate the device load voltage $V_d$ at point P at a constant level on the basis of the following operation: when the commercial AC source voltage $V_l$ fluctuates beyond the device load voltage $V_d$, an inverter current flows reversely from the main power supply line 1 (commercial AC source) to the auxiliary power supply line 2 (inverter) due to the voltage difference between the two, so that voltage drops across the main supply line inductor $L_l$ and across the inverter inductor $L_i$ are developed in the direction that the commercial AC source voltage $V_l$ or the inverter source voltage $V_i$ is decreased at point P in substance. In contrast with this, when the commercial AC source voltage $V_l$ fluctuates below the device load voltage $V_d$, an inverter current flows forwardly from the auxiliary power supply line 2 (inverter) to the main power supply line 1 (commercial source) due to the voltage difference between the two, so that voltage drops across the main supply line inductor $L_l$ and across the inverter inductor $L_i$ are developed in the direction that the commercial AC source voltage $V_l$ or the inverter source voltage $V_i$ is increased at point P in substance.

A more detail description of the above operation will vectorically be made hereinbelow with reference to the vector diagrams shown in FIG. 3(A), 3(B), 4(A) and 4(B).

Figure 3A:
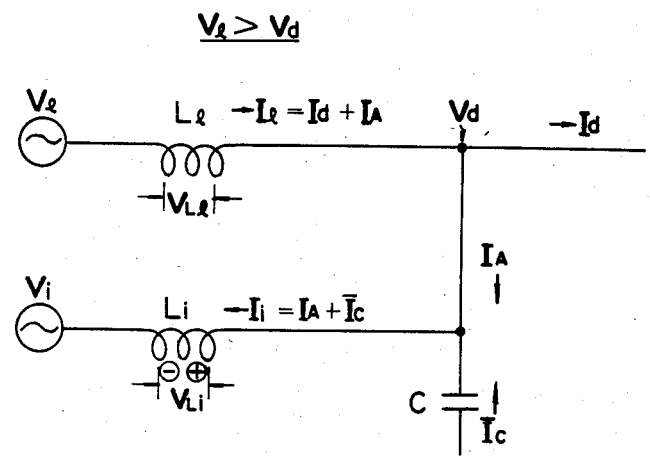
FIG. 3(A) is an equivalent circuit diagram of the commercial AC power source line and the power inverter for assistance in explaining the voltage regulating operation against commercial power source voltage fluctuation, which corresponds to the case where commercial power source voltage is higher than load voltage.
Figure 3B:
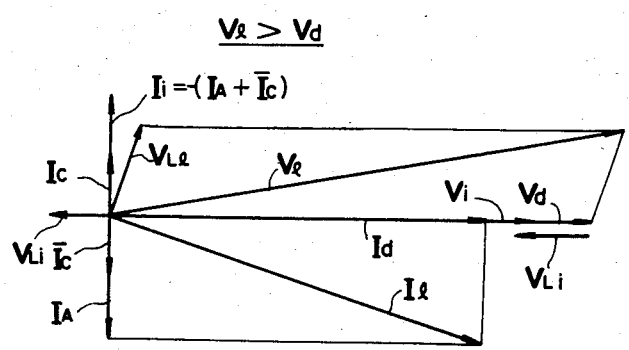
FIG. 3(B) is a vector diagram of respective voltages and currents developed or flowing in the equivalent circuit diagram shown in FIG. 3(A)

(a) When the commercial AC power source (line) voltage $V_l$ fluctuates beyond the device load voltage $V_d$ ($V_l > V_d$):

FIG. 3(A) shows an equivalent circuit and FIG. 3(B) shows a vector diagram under these conditions.

The commercial AC source voltage $V_l$ can vectorically be divided into a main power supply line inductor voltage $V_{Ll}$ developed across the line inductor $L_l$ and a device load voltage $V_d$ as follows:

$$V_l = V_{Ll} + V_d$$

The above vector equation can be represented as shown in FIG. 3(B) with $V_d$ set on the abscissa. The above vector diagram indicates a case where the phase difference between $V_{Ll}$ and $V_d$ is less than 90 degrees and therefore $V_l$ is higher than $V_d$.

Because of the line inductor $L_l$, the main power supply line current $I_l$ flows lagging by a phase angle of 90 degrees with respect to the line inductor voltage $V_{Ll}$ as shown. Further, the main line current $I_l$ can vectorically be divided into a device load current $I_d$ flowing through the device load and an auxiliary power supply line current $I_A$ flowing through the power inverter. In this case, the assumption is made that the device load includes no inductive or capacitive impedance. Therefore, the device load current $I_d$ is shown in FIG. 3(B) in phase with the device load voltage $V_d$ and the auxiliary line current $I_A$ is shown in the same drawing lagging by a phase angle of 90 degrees with respect to the device load current $I_d$. The above relationship between $I_d$ and $I_A$ can be expressed as $$I_l = I_d + I_A$$

Further, since a capacitance C is connected to the inverter output, a capacitor charging current $I_c$ flows through the capacitor leading by a phase angle of 90 degrees with respect to the device load voltage $V_d$. However, since this capacitor electric charge is discharged into the auxiliary power supply line, a capacitor discharge current $\bar{I}_c$ flows in the opposite direction in phase with the auxiliary power supply line current $I_A$.

Accordingly, a current $(I_A + \bar{I}_c)$ flows into the inverter reversely, which is the addition of the auxiliary line current $I_A$ and the capacitor dicharge current $\bar{I}_c$.

Here, when seen from the inverter side, the inverter current $I_i$ is obtained by reversing the direction thereof as follows:

$$I_i = -(I_A + I_c)$$

Therefore, a voltage $V_{Li}$ is developed across the inverter inductor $L_i$ leading by a phase angle of 90 degrees with respect to the inverter current $I_i$ as shown in FIG. 3(B). Here, it should be noted that the inverter current $I_i$ flows reversely into the inverter and therefore the polarity of the voltage $V_{Li}$ developed across the inverter inductor $L_i$ is positive on the device load side and negative on the inverter side in the direction that the device load voltage $V_d$ can be decreased. That is to say, since the inverter voltage $V_i$ is given as $$V_i = V_d + V_{Li}$$

and the inverter inductor voltage $V_{Li}$ is negative, the device load voltage $V_d$ is reduced by $V_{Li}$. Further, it is also possible to consider that a voltage drop is developed across the line inductor $L_l$ due to the auxiliary line current $I_A$ in the direction that the device load voltage $V_d$ is reduced.

Figure 4A:
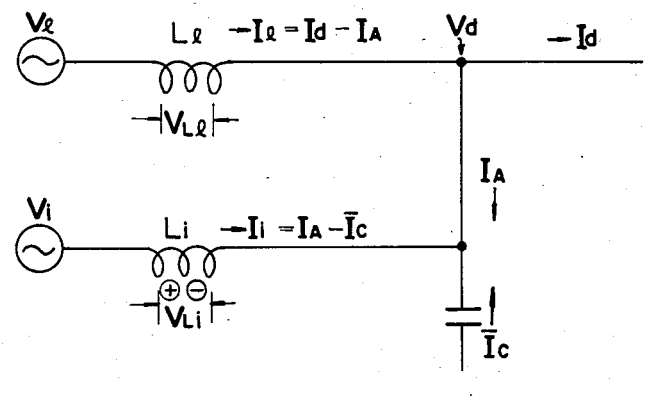
FIG. 4(A) is an equivalent circuit diagram similar to FIG. 3(A), which corresponds to the case where commercial power source voltage is lower than load voltage.
Figure 4B:
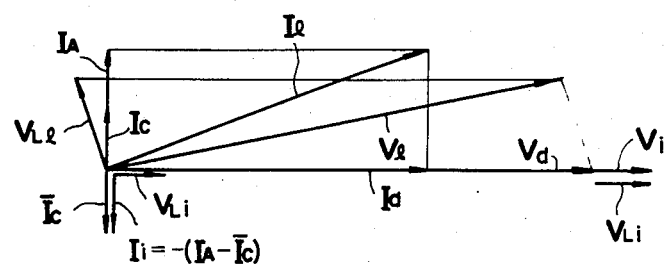
FIG. 4(B) is a vector diagram of respective voltages and currents developed or flowing in the equivalent circuit diagram shown in FIG. 4(A)

(b) When the commercial AC power source (line) voltage $V_l$ fluctuates below the device load voltage $V_d$ ($V_l < V_d$):

FIG. 4(A) shows an equivalent circuit and FIG. 4(B) shows a vector diagram under these conditions. Similarly, the line voltage $V_l$ can vectorically be divided into two vectors as follows:

$$V_l = V_{Ll} + V_d$$

The above vector equation can be represented as shown in FIG. 4(B) with $V_d$ set on the abscissa. The above vector diagram indicates a case where the phase difference between $V_{Ll}$ and $V_d$ is more than 90 degrees and therefore $V_l$ is lower than $V_d$.

Because of the line inductor $L_l$, a main power supply line current $I_l$ flows lagging by a phase angle of 90 degrees with respect to the line inductor voltage $V_{Ll}$ as shown. Further, the device load current $I_d$ can vectorically be obtained by subtracting the auxiliary power supply line current $I_A$ from the main power supply line current $I_l$. In this case, since the device load includes no inductive or capacitive impedance, the load current $I_d$ is shown in FIG. 4(B) in phase with the load voltage $V_d$ and the auxiliary line current $I_A$ is shown in the same drawing leading by a phase angle of 90 degrees with respect to the device load current $I_d$. The above relationship betwee $I_d$ and $I_A$ can be expressed as $$I_d = I_l - I_A$$

In the same way as shown in FIG. 3(B), a capacitor discharge current $\bar{I}_c$ flows lagging by a phase angle of 90 degrees with respect to the device load voltage $V_d$.

Accordingly, a current $(I_A - \bar{I}_c)$ flows through the inverter forwardly, which is the subtraction of the capacitor discharge current $\bar{I}_c$ from the auxiliary line current $I_A$.

Here, when seen from the inverter side, the inverter current $I_i$ is obtained by reversing the direction thereof as follows:

$$I_i = -(I_A - I_c)$$

Therefore, a voltage $V_{Li}$ is developed across the inverter inductor $L_i$ leading by a phase angle of 90 degrees with respect to the inverter current $I_i$ as shown in FIG. 4(B). Here, it should be noted that the polarity of the voltage developed across the inverter inductor $L_i$ is positive on the inverter side and negative on the device load side in the direction that the device load voltage $V_d$ can be increased. That is to say, since the inverter voltage $V_i$ is given as $$V_i = V_d + V_{Li}$$

and the inverter inductor voltage $V_{Li}$ is positive, the device load voltage $V_d$ is increased by $V_{Li}$.

(5) Under the same conditions where the commercial AC power source is normally supplied, it is possible to charge the inverter battery on the basis of the following operation: when the commercial AC power source frequency is fo, an inverter frequency is set to a frequency a little lower than fo by adjusting the inverter power presetting device 72. Under these frequency condition, an inverter current flows reversely from the main power supply line 1 (commercial AC source) to the subsidiary power supply line 2 (inverter) due to the phase difference between the two, so that the power is supplied to the battery through the inverter 10.

In more detail, when no battery charging power is required, the power presetting device 72 is set to nearly zero. In this case, as described already, since the inverter output is in phase with the device load voltage $V_d$, almost no effective power is transmitted between the main line 1 and the auxiliary line 2. Here, it should be noted that: if $P_s + 0$ and therefore $p_i + 0$, since the effective power supplied from the inverter is zero, the phase difference between the commercial voltage $V_l$ and the inverter voltage $V_i$ is zero. Therefore, the inverter power $P_i$ detected by the power detector 71 is nearly zero. As a result, the frequency difference $\Delta f$ obtained by the power comparator 73 is also roughly zero. In other words, the inverter outputs an induced signal having a frequency fo the same as the commercial AC source frequency and in phase with the device load voltage $V_d$.

In contrast with this, when a battery charging power is required, the power presetting device 72 is set to an appropriate value $P_s$. Therefore, the power comparator 73 outputs a positive power difference signal $\Delta f = P_s - P_i$ (inverter power $P_i$ is roughly zero); as a result, the frequency adder 32 outputs a voltage level $(f - \Delta f)$ in order to reduce the inverter frequency. Once the inverter frequency is reduced, a power is reversely supplied from the main line 1 to the auxiliary line 2 due to the phase difference. Accordingly, the power detector 71 detects a voltage level indicative of negative inverter output power, so that the power difference signal $(\Delta f = P_s - P_i)$ outputted from the power adder 73 is reduced to a fixed value, so that the inverter frequency $(fo - \Delta f)$ next increases to reduce the power. When the power blances with the value determined by the frequency difference $(\Delta f = P_s - P_i)$, the inverter frequency $(fo - \Delta f)$ is fixed at a value lower than fo in order to stably charge the inverter battery B. Here, since the inverter 10 is provided with a reverse circuit path to supply power reversely (diodes are connected in parallel with each thyristor in the reverse direction), it is possible to pass an inverter battery charging current reversely through the inverter from the main commercial AC power supply line to the inverter battery B.

A more detail description of the above operation will vectorically be made hereinbelow with reference to the vector diagrams shown in FIGS. 5(A), 5(B), 6(A) and 6(B), in which the voltage regulating operation and the battery charging operation are combined together.

Figure 5A:
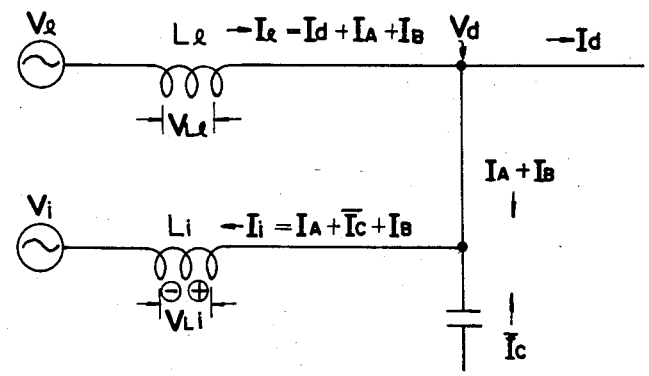
FIG. 5(A) is an equivalent circuit diagram of the commercial AC power source line and the power inverter for assistance in explaining both the voltage regulating operation against commercial power source voltage fluctuation and the battery charging operation, which corresponds to the case where commercial power source voltage is higher than load voltage.
Figure 5B:
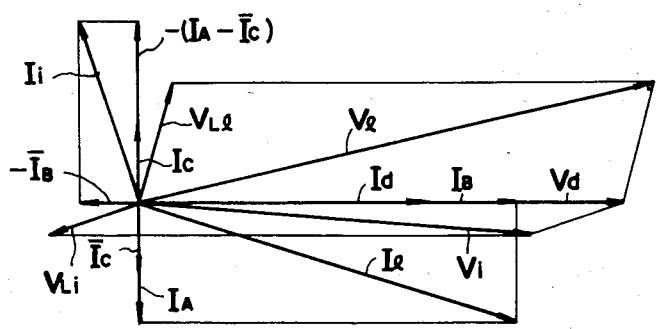
FIG. 5(B) is a vector diagram of respective voltages and currents developed or flowing in the equivalent circuit diagram shown in FIG. 5(A)

(a) when the commercial AC power source (line) voltage $V_l$ fluctuates beyond the device load voltage $V_d (V_l > V_d)$:

FIG. 5(A) shows an equivalent circuit and FIG. 5(B) shows a vector diagram under these conditions.

Similarly to FIGS. 3(A) and 3(B), the commercial AC source voltage $V_l$ can vectorically be divided into $V_{Ll}$ and $V_d$ as follows:

$$V_l = V_{Ll} + V_d$$

Because of the line inductor $L_l$, the main power supply line current $I_l$ flows lagging by a phase angle of 90 degrees with respect to the line inductor voltage $V_{Ll}$ as shown.

Further, the main line current $I_l$ can vertically be divided into an addition of a device load current $I_d$ and a battery charging current $I_B$ and an auxiliary line current $I_A$. In this case, the battery charging current $I_B$ is in phase with the device load current $I_d$; however, the auxiliary line current $I_A$ lags the device load current $I_d$ by a phase difference of 90 degrees.

The above relationship can be expressed as $$I_l = (I_d + I_B) + I_A$$

Further, a capacitor discharge current $\bar{I}_c$ flows in phase with the auxiliary line current $I_A$.

Accordingly, a current $(I_A + \bar{I}_c)$ flows into the inverter reversely, which is the addition of the auxiliary line current $I_A$ and the capacitor discharge current $\bar{I}_c$. Additionally, when seen from the inverter side, the battery charging current $I_B$ is reversed as $-I_B$.

Therefore, the inverter current can be obtained by vectorically adding as follows:

$$I_i = -(I_A + i_c + I_B)$$

Therefore, a voltage $V_{Li}$ is developed across the inverter inductor $L_i$ leading by a phase angle of 90 degrees with respect to the inverter current $I_i$ as shown in FIG. 5(B). Here, it should be noted that the inverter current $I_i$ flows reversely into the inverter are therefore the polarity of the voltage $V_{Li}$ developed across the inverter inductor $L_i$ is positive on the device load side and negative on the inverter side in the direction that the device load voltage $V_d$ can be reduced. That is to say, since the inverter voltage $V_i$ is given as $$V_i = V_d + V_{Li}$$

and the inverter inductor voltage $V_{Li}$ is negative, the device load voltage $V_d$ is vectorically reduced by $V_{Li}$. Futher, it is also possible to consider that a voltage drop is developed across the line inductor $L_l$ due to the auxiliary line current $I_A$ in the direction that the device load voltage $V_d$ is reduced.

Figure 6A:
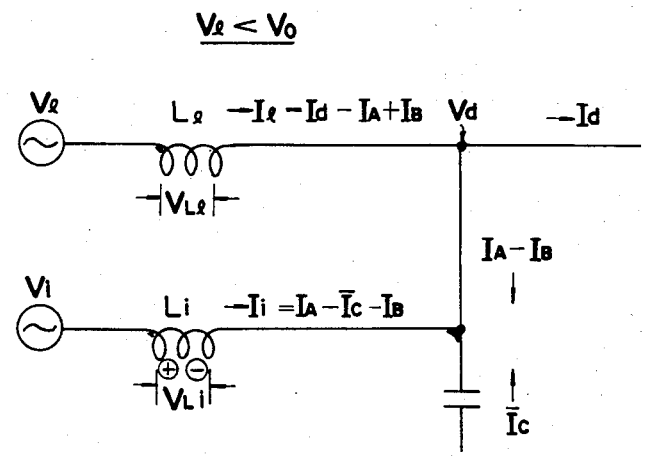
FIG. 6(A) is an equivalent circuit diagram similar to FIG. 5(A), which corresponds to the case where commercial power source voltage is lower than load voltage.
Figure 6B:
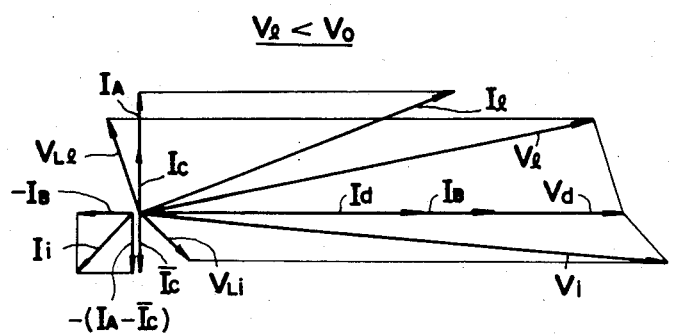
FIG. 6(B) is a vector diagram of respective voltages and currents developed or flowing in the equivalent circuit diagram shown in FIG. 6(A).

(b) when the commercial AC source (line) voltage $V_l$ fluctuates below the device load voltage $V_d$ ($V_l < V_d$):

FIG. 6(A) shows an equivalent circuit and FIG. 6(B) shows a vector diagram under these conditions.

Similarly to FIGS. 4(A) and 4(B), the commercial AC line voltage $V_l$ can vectorically be divided into $V_{Ll}$ and $V_d$ as follows:

$$V_l = V_{Ll} + V_d$$

Because of the line inductor $L_l$, the line current $I_l$ flows lagging by a phase angle of 90 degrees with respect to the line inductor voltage $V_{Ll}$ as shown.

Further, the device load current $I_d$ can be obtained by subtracting the auxiliary line current $I_A$ from the main line current $I_l$. In this case, the battery charging current $I_B$ is in phase with the device load current $I_d$; however, the auxiliary line current $I_A$ leads the device load current $I_d$ by a phase difference of 90 degrees. The above relationship can be expressed as $$I_l = (I_d + I_B) - I_A$$

Further, a capacitor discharge current $\bar{I}_c$ flows 180 degrees out of phase with the auxiliary line current $I_A$.

Accordingly, a current $(I_A - \bar{I}_c)$ flows through the inverter forwardly, which is the subtraction of the capacitor discharge current $\bar{I}_c$ from the auxiliary line current $I_A$. Here, when seen from the inverter side, the above current is reversed as $-(I_A - \bar{I}_c)$. Additionally, when seen from the inverter side, the battery charging current $I_B$ is reversed as $-I_B$.

Therefore, the inverter current can be obtained by vectorically adding as follows:

$$I_i = -(I_A - I_c + I_B)$$

Therefore, a voltage $V_{Li}$ is developed across the inverter inductor $L_i$ leading by a phase angle of 90 degrees with respect to the inverter current $I_i$ as shown in FIG. 5(B). Here, it should be noted that the inverter current $I_i$ flows forwardly through the inverter are therefore the polarity of the voltage developed across the inverter inductor $L_i$ is positive on the inverter side and negative on the device load side in the direction that the device load voltage $V_d$ can be increased. That is to say, since the inverter voltage $V_i$ is given as $$V_i = V_d + V_{Li}$$

and the inverter inductor voltage $V_{Li}$ is positive, the devive load voltage $V_d$ is vectorically increased by $V_{Li}$. Further, it is also possible to consider that a voltage rise is developed across the line inductor $L_l$ due to the auxiliary line current $I_A$ in the direction that the device load voltage $V_d$ is increased.

As described above, in the power supply equipment proof against interruption of service according to the present invention, since no power rectifier, no constant-voltage battery charger, no automatic voltage regulator are provided therefor, the equipment is small in size, low in cost and high in total power efficiency.

Further, since the power inverter is connected in parallel with the main power supply line even while the commercial AC power source is on or normal, it is possible to smoothly and reliably supply inverter power to the load immediately after the commercial AC power source has failed or the commercial voltage deviates from a predetermined voltage range monitored by the AC power monitor.

Further, since the commercial AC power source is connected to the main power supply line after the power inverter phase is allowed to match the commercial AC source phase by the phase matching sections, in the case where the commercial AC power source changes from abnormal to normal, it is possible to substantially prevent power from being transmitted or received between the main power supply line and the auxiliary power supply line, so that the power loss within the power inverter is kept at its minimum while the commercial source is normal, thus enhancing power efficiency.

Further, since the inverter power source substantially matches the commercial power source in frequency, voltage and phase, it is possible to regulate the device load voltage substantially at a constant level on the basis of voltage drops across the inverter inductance and the main line inductance caused by an inverter current flowing from the main power source line to the auxiliary power source line or vice versa.

Further, since the inverter power source frequency is reduced a little lower than the commercial AC power source frequency by the battery charging power presetting section, it is possible to charge the inverter battery when the commercial AC power source is normal, while regulating the load voltage at a constant level.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A power supply equipment backup system for interruption of service for supplying power from a commercial AC power source to a device load through a main power supply line (1) and from a battery DC source (B) to the device load through an auxiliary power supply line (2) connected in parallel with the main power supply line in relation to ground, which comprises:

(a) an AC switch (1a) connected to the commercial AC power source;

(b) a commercial AC power source mointoring means (20) connected to the commercial AC power source for outputting a power-on signal A to said AC switch (1a) for activating said AC switch (1a) to supply the commercial AC power source to the device load through the main power supply line when the commercial AC power source changes to a normal condition;

(c) power inverter means (10) having an inductor ($L_i$) and connected between the battery DC power source (B) and the device load for supplying an inverter power source to the device load through the auxiliary power supply line whenever the commercial AC power source is abnormal or normal;
(d) basic inverter frequency presetting means (30) for outputting a triangular wave signal to determine an inverter frequency substantially equal to said commercial AC power source frequency on the basis of a preset inverter frequency value (fo);
(e) basic inverter voltage presetting means (40) connected to an output terminal of said inverter means (10) for outputting a DC voltage signal to determine an inverter voltage substantially equal to said commercial AC power source voltage on the basis of a preset inverter voltage value ($V_o$);
(f) inverter controlling means (50) connected to said inverter frequency presetting means (30) and said inverter voltage presetting means (40) for comparing the triangular wave signal with the DC voltage signal in voltage level and for outputting inverter control signals to said inverter means (10), inverter frequency being determined by the triangular wave signal frequency, and further inverter voltage being determined by time intervals during which the triangular wave signal exceeds the DC voltage signal in voltage level,
(g) a main power supply line inductor ($L_l$) connected between said AC switch (1a) and the device load with an output terminal of said inverter means (10) connected to a junction point between said inductor ($L_l$) and the device load;
(h) phase matching means (60) including phase difference detecting means connected between the commercial AC power source and said basic inverter frequency presetting means (30) and connected by a feedback loop from said inverter controlling means (50), said phase matching means detecting a phase difference between the commercial AC power source and the inverter power source, outputting a phase difference signal to said basic inverter frequency presetting means (30) to adjust the inverter power source frquency (fi) to the commercial AC power source frequency (fc), and outputting a phase match signal B to said commercial AC power source monitoring means (20) for allowing said monitoring means (20) to output a power-supply signal C to said AC switch (1a) to supply the commercial AC power source to the device load when the inverter power source has matched the commercial AC power source in phase, said phase matching means (60) being connected to said basic inverter frequency presetting means (30) in response to the power-on signal A and disconnected from said basic inverter frequency presetting means (30) in response to the phase match signal B; and
(i) a battery charging power presetting means (70) connected between the output terminal of said inverter means (10) and said basic inverter frequency presetting means (30), said battery charging power presetting means (70) reducing inverter frequency (fi) to supply a battery charging power from the main power supply line (1) to the auxiliary power supply line (2) by passing a charging current from the commercial AC power source to the battery through said inverter means (10) in dependence upon a small phase difference between the commercial AC power source and the inverter power source caused by a small frequency difference between the two, said battery charging power presetting means (70) being connected to said basic inverter frequency presetting means (30) in response to the power-supply signal C outputted from said commercial AC power source monitoring means (20) when the commercial AC power source changes to the normal condition.

2. The power supply equipment backup system for interruption of service as set forth in claim 1, wherein said AC switch (1a) comprises a plurality of thyristors.

3. The power supply equipment backup system for interruption of service as set forth in claim 1, wherein said commercial AC power source monitoring means (20) comprises a relay activated in response to the commercial AC power source voltage.

4. The power supply equipment backup system for interruption of service as set forth in claim 1, wherein said power inverter means (10) comprises:
(a) an inverter circuit (10a) including a plurality of semiconductor switching elements and a plurality of diodes each of which is connected reversely in parallel with each of said semiconductor switching elements for allowing a reverse current to pass from the inverter output terminal to the battery B;
(b) an inverter matching transformer (Tr) connected to said inverter circuit (10a) for matching inverter output inpedance with device load impedance for facilitating power transmission between the commercial AC power source and said inverter means; and
(c) a filtering circuit including an inverter inductance ($L_i$) and an inverter capacitor (C), said filtering circuit converting a pulse inverter power source output signal into a sine-wave inverter power source output signal corresponding to a wave form of the commercial AC power source.

5. The power supply equipment backup system for interruption of service as set forth in claim 1, wherein said basic inverter frequency presetting means (30) comprises:
(a) a basic inverter frequency presetting device (31) for presetting a basic inverter frequency in a form of DC voltage level;
(b) an inverter frequency adder (32) connected to said basic inverter frequency presetting device (31) for adding the basic inverter frequency voltage level (fo) and another inverter frequency adjusting voltage level ($\Delta f$) and outputting a DC voltage difference signal indicative of the difference ($f - \Delta f$) between the two;
(c) a voltage controlled oscillator (33) connected to said inverter frequency adder for outputting an oscillation signal, the frequency of the oscillation signal being proportional to the DC voltage difference signal ($f - \Delta f$); and
(d) a triangular-wave signal generator (34) connected to said voltage controlled oscillator (33) for outputting a triangular wave signal having a frequency corresponding to an oscillation signal frequency, the triangular wave signal being applied to said inverter controlling means (50).

6. The power supply equipment backup system for interruption of service as set forth in claim 1, wherein said basic inverter voltage presetting means (40) comprises:
(a) a voltage detector (41) connected to the output terminal of said inverter means (10) for detecting an inverter source output voltage or a device load voltage ($V_d$);

(b) a basic inverter voltage presetting device (42) for presetting a basic inverter voltage ($V_o$) in a form of DC voltage level; and (c) an inverter voltage adder (43) connected to said voltage detector (41) and said basic inverter voltage presetting device (42) for adding the device load voltage ($V_d$) and the basic inverter voltage ($V_o$) and outputting a voltage difference signal ($V_d - V_o$) between the two, the voltage difference signal ($V_d - V_o$) being applied to said inverter controlling means (50).

7. The power supply equipment backup system for interruption of service as set forth in claim 1, wherein said inverter controlling means (50) comprises:

(a) an inverter voltage-frequency comparator (51) connected to said basic inverter frequency presetting means (30) and said basic inverter voltage presetting means (40) for comparing the triangular wave signal indicative of inverter frequency (f) with the voltage difference signal (V) indicative of inverter voltage ($V_d - V_o$) and outputting inverter timing signals at each point of intersections between the triangular wave signal and the voltage difference signal in voltage level; and (b) an inverter controller (52) connected to said inverter voltage-frequency comparator (51) for outputting inverter activating signals to said inverter means (10) so that said inverter operates at a frequency corresponding to that of the triangular wave signal and at an effective voltage determined by the pulse width obtained in response to the inverter timing signals and in accordance with a pulse width modulation method.

8. The power supply equipment backup system for interruption of services as set forth in claim 1, wherein said phase matching means (60) comprises:

(a) a voltage transformer ($VT_2$) directly connected to the commercial AC power source;

(b) a phase difference detector (61) including a phase locking loop circuit and connected to said voltage transformer ($VT_2$) and said inverter controlling means (50) for outputting a positive phase difference pulse signal when an inverter control signal frequency (fi) is higher than said commercial AC power source frequency (fc) and a negative phase difference pulse signal when said commercial AC source frequency (fc) is higher than an inverter control signal frequency (fi) and smoothing the phase difference pulse signal ($\Delta f = fi - fc$) into a voltage level corresponding thereto, said phase difference detector (61) outputting a phase match signal B when the inverter source matches the commercial AC power source in phase; and (c) a phase switch (62) connected between said phase difference detector (61) and said basic inverter frequency presetting means (30) for transmitting the phase difference signal ($\Delta f$) to said basic inverter frequency presetting means (30), said switch (62) being closed in response to the power-on signal A outputted from said commercial AC source monitoring means (20) and opened in response to the phase-match signal B outputted from said phase difference detector (61).

9. The power supply equipment backup system for interruption of service as set forth in claim 1, wherein said battery charging power presetting means (70) comprises:

(a) a current transformer (CT) connected to the output terminal of said power inverter (10);

(b) a voltage transformer ($VT_1$) also connected to the output terminal of said power inverter (10);

(c) a power detector (71) connected to said current transformer (CT) and said voltage transformer ($VT_1$) for detecting a power ($P_i$) supplied from the supply line (2) in a form of DC voltage level;

(d) a battery charging power presetting device (72) for presetting a desired battery charging power ($P_s$) in a form of DC voltage level;

(e) a battery charging power adder (73) connected to said power detector (71) and said battery charging power presetting device (72) for adding the detected power ($P_i$) and the preset power ($P_s$) and outputting a power difference signal ($P_s - P_i$) between the two; and (f) a power switch (75) connected between said battery charging power adder (73) and said basic inverter frequency presetting means (30) for transmitting the power difference signal ($\Delta f = P_s - P_i$) to said basic inverter frequency presetting means (30), said power switch (75) being closed in response to the power-on signal A outputted from said commercial AC power source monitoring means (20).

10. A method of supplying power from a commercial AC power source to a device load through a main power supply line (1) and from a power inverter (10) including a battery DC power source (B) to the device load through an auxiliary power supply line (2) connected in parallel with the main power supply line in relation to ground, which comprises the following steps of:

(a) presetting a basic inverter frequency (fo) substantially near a frequency of the commercial AC power source;

(b) presetting a basic inverter voltage ($V_o$) substantially near a voltage of the commercial AC power source;

(c) activating the power inverter connected in the auxiliary power supply line (2) at the present basic frequency and voltage to supply the battery DC power source to the device load through the power inverter;

(d) detecting whether the commercial AC power source is normal or abnormal;

(e) when the commercial AC power source changes from abnormal to normal, detecting a phase difference between the commercial AC power source and inverter power source;

(f) matching the inverter power source phase with the commercial AC power source phase in dependence upon the detected phase difference;

(g) connecting the commercial AC power source to the device load when the inverter power source matches the commercial AC power source in phase to prevent power from being substantially transmitted between the main power supply line and the auxiliary power supply line, to supply an effective power required for the load from the commercial AC power source to the load and to regulate the device load voltage at a constant level;

(h) if the commercial AC power supply source is abnormal, disconnecting the commercial AC power source from the device load in the main power supply line (1);

(i) if the commercial AC power supply source is normal, connecting the commercial AC power source to the device load in the main power supply line (1) to supply the commercial AC power source in addition to the battery DC power source supplied through the power inverter in the auxiliary power supply line (2);

(j) presetting a desired battery charging power $P_s$ in a form of voltage;

(k) reducing power inverter frequency fo to lower than that of the commercial AC power source in dependence upon the preset battery charging power $P_s$; and (l) activating the power inverter at a reduced frequency to supply power from the main power supply line (1) to the auxiliary power supply line (2) for charging the battery DC power source through the power inverter.

11. The method of supplying power as set forth in claim 10, wherein the step of activating the power inverter at the basic inverter frequency (fo) comprises the following steps of:

(a) presetting a voltage level corresponding to a basic inverter frequency (fo);

(b) generating an oscillation signal whose frequency is proportional to the preset voltage level;

(c) generating a triangular wave signal whose frequency is equal to the oscillation signal frequency; and (d) activating the power inverter in response to the triangular wave signal.

12. The method of supplying power as set forth in claim 10, wherein the step of activating the power inverter at the basic inverter voltage comprises the following steps of:

(a) detecting a load voltage ($V_d$) at a point between the power inverter and the device load;

(b) presetting a voltage level corresponding to a basic inverter voltage ($V_o$);

(c) adding the detected load voltage ($V_d$) and the preset voltage ($V_o$) and outputting a voltage difference signal ($V_d - V_o$);

(d) comparing the triangular wave signal indicative of inverter frequency (f) with the voltage difference signal indicative of inverter voltage ($V_d - V_o$);

(e) outputting inverter timing signals at each point of intersections between the triangular wave signal and the voltage difference signal in voltage level; and (f) outputting inverter activating signals to the power inverter at an effective voltage determined by the pulse width obtained in response to the timing signals and in accordance with pulse width modulation method.

13. The method of supplying power as set forth in claim 10, wherein the step of detecting a phase difference between the commercial AC power source and the power inverter power source comprises the following steps of:

(a) outputting a positive phase difference pulse signal when the inverter frequency (fi) is higher than the commercial AC power source frequency (fc) and a negative phase difference pulse signal when the commercial AC source frequency (fc) is higher than the inverter frequency (fi); and (b) smoothing the phase difference signal ($\Delta f = fi - fc$) into a DC voltage level.

14. The method of supplying power as set forth in claim 12, wherein the step of matching the inverter power source phase with the commercial AC power source phase comprises the following steps of:

(a) adding the phase difference ($\Delta f = fi - fc$) between the commercial AC power source frequency (fc) and the inverter power source frequency (fi) to the basic inverter frequency (fo) in voltage level and outputting a phase difference DC voltage signal corresponding thereto, and (b) adjusting inverter power source frequency in response to the phase difference DC voltage signal in such a way that inverter frequency (fi) is decreased when the phase difference signal is positive and increased when the phase difference signal is negative.

15. The method of supplying power as set forth in claim 10, wherein the step of reducing the power inverter frequency comprises the following steps of:

(a) detecting an inverter power ($P_i$) at power inverter output in a form of voltage;

(b) comparing the detected inverter power ($P_i$) with the preset battery charging power ($P_s$) in voltage level and outputting a power difference signal ($\Delta f = P_s - P_i$); and (c) adding the power difference signal ($\Delta f$) to the basic inverter frequency (fo) and outputting a frequency reducing signal (fo $- \Delta f$);

(d) generating an oscillation signal whose frequency is proportional to the frequency reducing signal; and (e) generating a triangular wave signal whose frequency is equal to the oscillation signal.

* * * * *